United States Patent
Luangthep

(10) Patent No.: US 9,757,975 B2
(45) Date of Patent: Sep. 12, 2017

(54) PROCESS FOR PRODUCING A SURFACE FINISH

(75) Inventor: Thanpuying Supornpen Luangthep, Bangkok (TH)

(73) Assignee: FOUNDATION FOR THE PROMOTION OF SUPPLEMENTARY OCCUPATIONS AND RELATED TECHNIQUES OF HER MAJESTY QUEEN SIRIKIT, THE CHITRALADA PALACE, Bangkok (TH)

( * ) Notice: Subject to any disclaimer, the term of this patent is extended or adjusted under 35 U.S.C. 154(b) by 97 days.

(21) Appl. No.: 10/862,891

(22) Filed: Jun. 7, 2004

(65) Prior Publication Data

US 2005/0186325 A1 Aug. 25, 2005

(30) Foreign Application Priority Data

Feb. 16, 2004 (TH) ........................................ 088743

(51) Int. Cl.
| | |
|---|---|
| *B44C 5/06* | (2006.01) |
| *C09D 5/29* | (2006.01) |
| *C09D 5/36* | (2006.01) |
| *C09D 7/12* | (2006.01) |
| *B05D 5/00* | (2006.01) |

(52) U.S. Cl.
CPC ................. *B44C 5/06* (2013.01); *C09D 5/29* (2013.01); *C09D 5/36* (2013.01); *C09D 7/1233* (2013.01); *B05D 5/00* (2013.01)

(58) Field of Classification Search
CPC ............ B05D 5/00; B44C 5/06; C09D 7/1233
USPC .......................................................... 427/4
See application file for complete search history.

(56) References Cited

U.S. PATENT DOCUMENTS

| 1,721,741 | A | * | 7/1929 | Le Moult ....................... 156/265 |
| 3,638,709 | A | * | 2/1972 | Brown et al. ................... 156/57 |
| 5,656,343 | A | * | 8/1997 | Baker .............................. 428/17 |

FOREIGN PATENT DOCUMENTS

| CN | 1067852 A | 1/1993 |
| JP | 62-25599 U | 2/1987 |
| JP | 4-175200 A | 6/1992 |

OTHER PUBLICATIONS

English translation of CN 1067852 A, published Jan. 1993.*
T. Hariyama et al., "The Origin of the Iridescent Colors in Coleopteran Elytron", 2002, Forma, vol. 17, pp. 123-132.*
English Abstract of CN 1067852A.
Espacenet English abstract of JP 4-175200 A.
Edited by Izuru Niimura, Kojien, 3rd Edition, Japan, Iwanami Shoten, Nov. 20, 1984, p. 1512 (Item of the metallic wood-boring beetle).
Wikipedia, item of the Beetle Wing Shrine [online], searched on Aug. 24, 2010, the internet, URL=http://ja.wikipedia.org/wiki/%E7%UE%89%38%99%AB%E5%8E%A8%E5%AD%90, pp. 2-4.
Official Action (Decision of Rejection) issued by the Japanese Patent office dated Mar. 1, 2011 in respect of corresponding Japanese Patent Application No. 2004-173357 with English translation.
English translation of Appeal Board's Questioning issued by the Japanese Patent Office Jul. 24, 2012 in respect of corresponding Japanese Patent Application No. 2004-173357.
Office Action dated Jul. 2, 2013 for Application No. JP 2011-147109.
Office Action dated Jun. 7, 2013 for Indian Application No. 1109/DEL/2004.
Office Action dated Sep. 5, 2014 for Philippine Application No. 1-2004-000221.

* cited by examiner

*Primary Examiner* — Kristen Jolley
(74) *Attorney, Agent, or Firm* — Ladas & Parry LLP

(57) ABSTRACT

A process of applying a surface finish to a material selects an insect for the surface finish, completely dries the insect and removes tissue from underneath a surface of the insect for the surface finish.

13 Claims, No Drawings

PROCESS FOR PRODUCING A SURFACE FINISH

SUMMARY OF THE INVENTION

This invention is directed to a process for producing a surface finish from natural products having a lustrous surface with a gloss of various colors whose size can be selected to be large or small pieces as required and not easily broken, wherein the process is the utilization of natural characteristics and does not cause detrimental effects on the environment.

FIELD OF THE INVENTION

This invention relates to a process for producing a surface finish from natural products of a hard, brittle, lustrous nature with a gloss of various colors and not being easily broken.

BACKGROUND OF THE INVENTION

From the past to the present time man has created a variety of arts with different purposes such as for enhancing emotions, paying homage to one's creed. Therefore, there are many creative works in different forms of various arts. One of these creative works includes the finishing of the surface of materials, equipment or any objects by means of various methods such as surface etching, decoration of designs, printing, etc. One of the preferred methods is the application of materials to decorate surfaces. These materials are usually called surface finishes.

Surface finishes which are preferably used are natural products such as plants or animals. For example, the application of lustrous materials with a gloss of various colors on their surface. However, such materials usually have weak points in that they are highly brittle and apt to break.

DETAILED DESCRIPTION OF THE INVENTION

This invention is directed to a process for producing a surface finish from natural lustrous materials with a gloss of various colors which usually has high fragility and is apt to break whereby the invention aims to improve these weak points and this can be achieved by appropriate adaptation.

Materials suitable for use in the process of this invention should be of a high lustrous nature with a gloss of various colors. Preferably, these materials are obtained from insects that are usually chosen from hard-winged insects such as metallic wood-boring beetles in the family Buprestidae, of the order Coleoptera or other insects having the same characteristics.

The parts of these insects that should be used are their heads, bodies, joints or the undersides part of abdominal segments. The more suitable parts are wings because their sizes are appropriate and can be used in a variety of works. Although these insects have a short life cycle, it is not a reason why these insects are taken for use in this invention to produce a surface finish in any respect.

By the nature of the invention to conserve the nature, the present invention aims at insects that die naturally which also provides added value. According to researches, it has been found that a surface finish produced by the production process of this invention, by using various parts of insects that die naturally, will give a better result than using insects which do not die naturally. That is to say, the surface finish has a better gloss and is more lustrous and have property of increased resistance to breakage. Without being referred to any theories, the insects appropriate for use should be insects die naturally after reproduction. Usually, they are of approximately 9 months to 1 year old after hatching. Therefore, to achieve the purpose of this invention, it shall be of certainty that the insects die naturally which can be found from the specific nature of this invention only.

As an embodiment of this invention, said dead insects must be completely dried first which may be optional to carry out by many methods such as by sunlight or by dry heat with temperatures not too high to decompose insects or the required parts of such insects, for example, at temperatures around 30-40 degrees Celsius for about 1-2 days although the drying time may be longer than this depending upon the types of insects and other conditions.

In addition, a method may be selected to decompose the tissues underneath the surface of said surface finish which can be observed by the change of color of said surface finish piece from brown to black. This can be carried out without using any chemicals by removing the tissues with the application of suitable force such as the pressure from machinery or if necessary, from tool. In the present invention, it has found that if the age of an insect is not appropriate and the insect is not dried properly in accordance with the invention, these tissues cannot be removed from the insect parts without breaking them.

In this invention, it has also been found that the obtained thickness of a surface finish will affect the reflection of light and in turn affect its luster and gloss of colors, wherein its appropriate thickness is 0.1-1.5 mm, and more preferably is 0.5-1.0 mm.

When the desired thickness is obtained, it is optional that the surface finish may be divided by cutting into pieces of various sizes as required for an application.

The product produced in accordance with the process of this invention can be used solely in finishing the surface of any material, equipment or tools or together with other materials such as *Lygodium flexuosum* vine, rattan, bamboo or precious metal such as gold or together with any arts.

The invention claimed is:

1. A process of applying a surface finish to a material comprising the steps of:
    selecting a dead insect for said surface finish;
    completely drying said insect;
    removing tissue of said insect from underneath a surface of said insect for obtaining a desired thickness of 0.5-1.0 mm for said surface finish which affects luster and gloss of color; and
    applying said surface finish to said material,
    wherein said selecting step includes selecting a metallic wood-boring beetle that has died after reproduction as said dead insect,
    wherein said drying step includes drying by dry heat at temperatures in the range of 30-40 degrees Celsius for 1-2 days,
    wherein said insect dies naturally 9 months to 10 months after hatching.

2. The process according to claim 1, wherein said removing step includes removing by applying force to said tissue.

3. The process according to claim 1, further comprising cutting said insect into pieces for said surface finish.

4. The process according to claim 1, wherein said applying step further comprises applying other materials.

5. The process according to claim 4, wherein said other materials comprise at least one of *Lygodium flexuosum* vine, rattan, bamboo, and precious metal.

6. The process according to claim 1, wherein prior to removing the tissue of said insect, waiting for the tissue to decompose by observing a change of color of said surface finish from brown to black.

7. A product obtained from the process according to claim 1.

8. A process of applying a surface finish to a material comprising the steps of:
  selecting a dead insect for said surface finish;
  completely drying said insect;
  removing tissue of said insect from next to a wing, a body, and an underside part of an abdominal segment of said insect for obtaining a desired thickness of 0.5-1.0 mm for said surface finish which affects luster and gloss of color,
  said surface finish includes the wing, the body, and the underside part of the abdominal segment of the insect; and
  applying said surface finish to said material,
  wherein said selecting step includes selecting a metallic wood-boring beetle that has died after reproduction as said dead insect,
  wherein said drying step includes drying by dry heat at temperatures in the range of 30-40 degrees Celsius for 1-2 days,
  wherein said insect dies naturally 9 months to 10 months after hatching.

9. The process according to claim 8, wherein the process further comprises cutting the wing, the body, and the underside part of the abdominal segment of said insect into pieces for said surface finish.

10. A process of applying a surface finish to a material comprising the steps of:
  selecting a dead insect that has died naturally after reproduction for said surface finish;
  drying said insect by dry heat at temperatures in the range of 30-40 degrees Celsius for 1-2 days,
  removing tissue of said insect from underneath a wing, a head, a body, and an underside part of an abdominal segment of said insect for obtaining a desired thickness of 0.5-1.0 mm for said surface finish which affects luster and gloss of color; and
  applying said surface finish to said material,
  wherein said selecting step includes selecting a metallic wood-boring beetle as said dead insect,
  wherein the process further comprises cutting the wing, the head, the body, and the underside part of the abdominal segment of said insect into pieces for said surface finish, and
  wherein said insect dies naturally 9 months to 10 months after hatching.

11. The process according to claim 10, wherein said applying step further comprises applying other materials.

12. The process according to claim 11, wherein said other materials comprise at least one of *Lygodium flexuosum* vine, rattan, bamboo, and precious metal.

13. A process of applying a surface finish to a material, comprising the steps of:
  selecting a dead insect for said surface finish, wherein said dead insect is a metallic wood-boring beetle that has died after reproduction;
  using a hard shell of a wing, a body, and an underside part of an abdominal segment of said dead insect;
  completely drying the hard shell of the wing, the body, and the underside part of the abdominal segment;
  removing tissues located underneath the hard shell of the wing, the body, and the underside part of the abdominal segment for obtaining a desired thickness of 0.5-1.0 mm for said surface finish which affects luster and gloss of color;
  cutting the wing, the body, and the underside part of the abdominal segment into pieces; and
  applying the resulting surface finish to said material,
  wherein said drying step includes drying by dry heat at temperatures in the range of 30-40 degrees Celsius for 1-2 days,
  wherein said insect dies naturally 9 months to 10 months after hatching.

* * * * *